Patented Nov. 22, 1949

2,488,733

UNITED STATES PATENT OFFICE 2,488,733

ALKALINE EARTH HALOPHOSPHATE PHOSPHORS

Alfred H. McKeag and Peter W. Ranby, North Wembley, England, assignors to General Electric Company, a corporation of New York No Drawing. Application July 16, 1947, Serial No. 761,440. In Great Britain June 17, 1942

20 Claims. (Cl. 252—301.4)

This invention relates to electric discharge lamps and devices with associated luminescent materials or phosphors excitable by the discharge of rays in the devices, and particularly to such luminescent materials. An aim of the invention is to provide luminescent materials that differ from those previously known in composition and are adapted for use in fluorescent lamps, cathode ray tube screens, or X-ray screens—or for two or more of these uses. In general, luminescent materials of different composition differ in the color or efficiency of their luminescence, or in the exciting agency by which their luminescence is excited; but a new luminescent material closely resembling known materials in all these properties might in some cases or circumstances be valuable: for example, if tungsten were to become unavailable, other luminescent materials having luminescent properties like those of the well-known tungstates would be of interest.

This application is a continuation-in-part of our U. S. applications Serial No. 506,266, filed October 14, 1943, now abandoned, Serial No. 538,559, filed June 21, 1944, now abandoned, and Serial No. 651,989, filed March 4, 1946, now abandoned, all assigned to the assignee of this application.

We have found that various halo-phosphates of alkaline earth metals are useful as luminescent materials or phosphors when suitably activated. In general, halo-phosphates are compounds more or less analogous to the natural mineral apatite, and are supposed to be represented by a formula such as $3M_3(PO_4)_2 \cdot 1M'L_2$, where L represents a halogen or a mixture of halogens, and M and M' represent either different or identical bivalent metals or mixtures of such metals. Halo-phosphates here especially in question are artificial substances (compounds or complexes) comprising as essential lattice constituents one or more bivalent metals, the phosphate radical—$(PO_4)$, and one or more halogens, and having a lattice structure similar to that of apatite—i. e., a structure whose difference from that of apatite is no greater than might be expected to result, (a) from the partial or complete substitution of another alkaline earth metal or another halogen for those found in apatite, or (b) from the introduction of an activator. However, the essential feature of the phosphors here in question is that they comprise activated halo-phosphate matrices in which the metal of the halo-phosphate consists of alkaline earth metal. In some cases, the lattice structure of such phosphors may also include oxide(s) of such metal.

Generally speaking, artificial halo-phosphates are suitable according to this invention when at least half of the bivalent metal atoms are those of the alkaline earth metals calcium, strontium and barium or mixtures thereof, while at least half of the halogen atoms are of the group comprising fluorine, chlorine, or bromine (i. e., fluorine atoms, or chlorine atoms, or bromine atoms, or a mixture of atoms of two or more of these three halogens), this halo-phosphate being activated by an activator whereof part at least is preferably antimony, though if desired antimony may be replaced partly or wholly with bismuth as the activator, or with tin or lead. Several activator metals of this character may be used together, as, for example, antimony and bismuth, lead and tin; and such activating metal of the tin, lead, antimony, bismuth group (which are the group IV and group V metals in the odd numbered 7th and 11th series of the periodic system) may be supplemented with manganese, as explained hereinafter. However, no advantage is at present known to arise from introducing into the halo-phosphate any bivalent metal other than calcium, strontium, barium or manganese, or a halogen other than the three mentioned (i. e., iodine). In our experience, on the contrary, the introduction of such other metal or halogen in any considerable proportion reduces the efficiency of the luminescence; and when all the halogen is iodine, no appreciable or substantial luminescence is produced. But small proportions of other metals or of other halogens are innocuous. While bromine is, in general, less desirable than fluorine or chlorine, its use may widen the range of colors that can be obtained.

The proportion of activating antimony can be varied within wide limits, say from ½ per cent to 15 per cent by weight without any great change in the luminescent properties of the material; but proportions much outside this range decrease the luminescent efficiency. In general, the optimum proportion is usually within a range of 2 to 6 per cent. The color of the light under 2537 Å. excitation is a pale blue not very different from that of magnesium tungstate, or even a green blue in some cases.

When bismuth wholly or partially replaces antimony, the proportion of activating bismuth should generally be greater than the amount of antimony replaced: thus while 2 to 6 per cent of antimony is preferred the preferred amount of bismuth when no antimony is present may be as high as 7½ per cent.

Suitable percentages of tin and of lead are indicated in examples hereinafter.

Besides the primary activators above mentioned, our halophosphate phosphor may also contain manganese; indeed, one of the most advantageous features of luminescent materials activated with antimony according to the invention is the wide range of color through which the light produced can be varied by varying the proportion of supplemental manganese employed. In general, increasing percentages of manganese increase the wave-length of the dominant hue from pale blue or green-blue through cream or white with a yellowish, pinkish, or orange tinge to yellow, orange, or even red. With tin and lead, likewise, increasing amounts of supplemental manganese from zero up to a limit commonly less than 10 per cent generally shift the color of the luminescent light toward red, and usually increase its intensity. With bismuth, however, the effect of supplement manganese is rather different; it often produces little or no change in color, but it may increase the efficiency of luminescence appreciably. But while manganese is thus valuable as a modifying or supplemental activator, it is doubtful whether it should be considered a primary activator, since under excitation of halophosphate by 2537 A. radiation, at any rate, manganese without other activator produces little if any luminescence.

The following table illustrates the variation in color of some calcium and strontium halo-phosphate phosphors activated with a fixed proportion of antimony and with varying proportions of manganese. The first row in the table gives the proportion by weight of antimony, which is always 3 per cent, and of manganese; the first column gives the constitution of the matrix; and the entries in the other columns give the color of the luminescent light from the various matrices when they contain the percentages of manganese indicated, as well as the constant percentage of antimony—blank spaces representing cases which are not here reported on. The excitation of the luminescence here indicated is in all instances due to the unfiltered radiation of a low-pressure mercury discharge lamp having a quartz envelope; since the phosphors are hardly excited by 3650 A. radiation, this means excitation wholly or largely by 2537 A., although the apparent color is of course slightly affected by the admixture of visible light from the discharge lamp with the luminescent light of the phosphor. The color of the luminescent light of our phosphors varies somewhat according to the exact method of their preparation, as well as according to their gross composition; the colors given in the table refer to materials prepared by the preferred method hereinafter described.

| 3% Sb + | 0% Mn | ½% Mn | 1% Mn | 2% Mn | 5% Mn |
|---|---|---|---|---|---|
| $3Ca_3(PO_4)_2 \cdot 1CaF_2$ | Pale Blue | Bluish White | Yellowish White | Pale Yellow | Yellow. |
| $12Ca_3(PO_4)_2 \cdot 3CaF_2 \cdot 1CaCl_2$ | do | Whitish | Cream-white | Yellow-orange | Deep Orange. |
| $6Ca_3(PO_4)_2 \cdot 1CaF_2 \cdot 1CaCl_2$ | do | do | Pinkish White | Pale Orange | Orange-Pink. |
| $12Ca_3(PO_4)_2 \cdot 1CaF_2 \cdot 3CaCl_2$ | do | do | do | Orange | |
| $3Ca_3(PO_4)_2 \cdot 1CaCl_2$ | Green-Blue | Purple-White | | Pink | |
| $6Ca_3(PO_4)_2 \cdot 6Sr_3(PO_4)_2 \cdot 1CaF_2 \cdot 1CaCl_2$: $1SrF_2$: $1SrCl_2$ | | | Orange White | | |
| $3Sr_3(PO_4)_2$: $1SrF_2$ | Green-Blue | | | | Dull Red. |
| $6Ca_3(PO_4)_2$: $1CaCl_2$: $1CaBr_2$ | | | | | |

Our luminescent materials are well excited by cathode-rays of 6000 electron-volts energy and by X-rays of 1 A. wave-length, as well as by short-wave ultraviolet of 2537 A. They are only excited much more feebly, if at all, by long-wave ultraviolet of 3650 A.

The obvious method of preparing a luminescent material in which the halo-phosphate matrix is $3M_3(PO_4)_2 \cdot 1M'L_2$ would be to heat together a mixture of $M_3(PO_4)_2$ with $M'L_2$, an antimony or other primary activator compound, and (if desired) a manganese compound. However, there does not appear to be any easy method for producing with certainty, in the cold, a pure compound $M_3(PO_4)_2$ wherein M is an alkaline earth metal; hence it is convenient to introduce the constituent alkaline earth metal M and phosphate radical—$(PO_4)$ in some form which is not or may not be $M_3(PO_4)_2$. We know of no reason, on the other hand, why the constituent alkaline earth metal M' and halogen L should not be introduced as halide(s) $M'L_2$. In general, the luminescent material may be prepared by heating to a temperature in the neighborhood of 1000° C. or higher (e. g., 1000 to 1150° C.) material containing (as essential elements for present purposes) one or more alkaline earth metals, one or more halogens, antimony or other principal activator metal(s), manganese (if desired), phosphorus, and oxygen, such material being usually a mixture of several chemical compounds and having the phosphorus and oxygen present as the appropriate radical.

Hereafter, for brevity, the expression "phosphate of M (or of a particular alkaline earth metal)" will be used to denote, indifferently, either a substance containing the metal(s) M in chemical combination with the radical — $(PO_4)$, or a mixture whence such a substance would be produced by heating to a temperature to or at which the total raw mixture of the phosphor constituents or ingredients is heated during the production of the activated halo-phosphate. Accordingly, the preferred method of making our luminescent material is to heat a mixture of phosphate of the metal(s) M with halide $M'L_2$, antimony or a compound thereof, and (if desired) manganese or a compound thereof. A preferred antimony compound is the trioxide, and a preferred manganese compound is the phosphate prepared as described hereinafter. There is some evidence that manganese phosphate thus prepared is not exactly a simple chemical compound as suggested by the name; for the effect of the manganese on the luminescent color of the final product depends somewhat on the conditions of precipitation in the described method of preparing the manganese phosphate, as well as on the conditions and (perhaps) the time of heating in the final synthesis of all the phosphor ingredients to form the phosphor.

The starting materials used in connection with the preparation of the phosphor should all be of high commercial purity (chemically pure or reagent quality). Chlorides and bromides of the alkaline earth metals and antimony trioxide may be used as bought; but it must be remembered that these "dry" chlorides and bromides as bought usually contain an appreciable amount of water, which is not deleterious but must be taken into account in determining the amount of halide $M'L_2$ that is actually introduced.

*Calcium and strontium halophosphate*

From bought materials of the purity above indicated, phosphates to be used in making our phosphor are preferably prepared as follows:

To prepare calcium phosphate, 600 g. calcium carbonate is added slowly, with constant stirring, to 250 ml. phosphoric acid which has been diluted with 550 ml. distilled water. When effervescence has ceased, the precipitate is filtered off, washed with hot water, dried at 160° C., and ground to a fine powder. Strontium phosphate may be prepared by an analogous method. To prepare manganese phosphate, 396 g. ammonium hydrogen phosphate, $(NH_4)_2HPO_4$, is dissolved in 2 liters of boiling distilled water to form solution A, and 594 g. manganese chloride is dissolved in 3 liters of distilled water to form solution B. To each of solutions A and B, add 10 ml. of the other; then filter each, and mix the filtrates together. The resulting precipitate is separated off by filtration, washed with boiling distilled water, dried at 160° C., and then ground. To prepare lead phosphate, 189 g. lead acetate is dissolved in 500 ml. hot distilled water to form solution C, and 44 g. diammonium phosphate is dissolved in 250 ml. hot distilled water to form solution D. 10 ml. of solution C is added to solution D, and vice-versa; the solutions are filtered, and the filtrates mixed together; the resulting precipitate is filtered off, washed six times with hot distilled water, dried at 160° C., and then ground.

From bought materials of the purity above indicated, fluorides to be used in making our phosphor are preferably prepared as follows:

To prepare calcium fluoride, 666 g. dry calcium chloride is dissolved in 2 liters of distilled water to form solution E, and 444 g. ammonium fluoride is dissolved in 2 liters of distilled water to form solution F. To each of solutions E and F add 10 ml. of the other; then filter each, and mix the filtrates together. The resulting precipitate is separated off by filtration, washed with boiling distilled water, dried at 160° C., and then ground. Strontium fluoride may be prepared by an analogous method.

As regards the proportions of components in the final synthesis of the phosphor, it is to be remarked that slight excess of the phosphate radical — ($PO_4$) over the theoretical or stoichiometric proportion according to the formula $3M_3(PO_4)_2 \cdot 1M'L_2$ has little bad effect on the luminescent efficiency of the product, though it may change the color, but that a deficiency of phosphate is apt to reduce the luminous efficiency more seriously.

The raw mixture of the ingredients used should be ground thoroughly, as by ball-milling, placed in a quartz tube which is plugged at one end (i. e., the end extending outside the furnace used to heat the tube) with glass-wool, heated for one-half hour as indicated below, ground as before, heated as before for another one-half hour, again ground, washed with distilled water, and then dried at 160° C. The temperature of heating should approach as nearly as may be to that at which the mixture begins to sinter but should never be high enough to melt the mix. When the proportion of manganese is changed—other things being unchanged—the melting and sintering temperatures generally decrease as the proportion of manganese increases; consequently, in general, mixtures with higher manganese contents should be heated to lower temperatures than those with lower manganese contents. The range of suitable temperatures is roughly 1000°–1150° C. However, for phosphors comprising tin or lead as activators, a temperature around 1100° C. may be preferred.

The following examples indicate how the proportions of ingredients in the mixture may be chosen:

*Example 1.*—If the material is to have a matrix $3Ca_3(PO_4)_2 \cdot 1CaCl_2$ and is also to contain 3 per cent Sb and 2 per cent Mn, the raw mixture may consist of:

| | Grams |
|---|---|
| Calcium phosphate | 37.2 |
| Calcium chloride containing 25% water | 4.9 |
| Antimony trioxide | 1.25 |
| Manganese phosphate | 2.1 |

*Example 2.*—If the material is to have a matrix $12Ca_3(PO_4)_2 \cdot 1CaF_2 \cdot 3CaCl_2$ and is also to contain 3 per cent Sb and 2 per cent Mn, the formula in Example 1 is modified by replacing 1.2 g. of the calcium chloride with 0.65 g. calcium fluoride.

*Example 3.*—If the material is to have a matrix $6Ca_3(PO_4)_2 \cdot 1CaF_2 \cdot 1CaCl_2$ and is also to contain 3 per cent Sb and 2 per cent Mn, the formula in Example 1 is modified by replacing 2.45 g. of the calcium chloride with 1.3 g. calcium fluoride.

*Example 4.*—If the material is to have a matrix $12Ca_3(PO_4)_2 \cdot 3CaF_2 \cdot 1CaCl_2$ and is also to contain 3 per cent Sb and 0.5 per cent Mn, the formula in Example 1 is modified by replacing 3.65 g. of the calcium chloride with 1.95 g. calcium fluoride and by reducing the manganese phosphate to 0.5 g.

*Example 5.*—If the proportion of Mn in Example 4 is to be 5 per cent, instead of 0.5 per cent, the manganese phosphate should be 5.1 g. instead of 0.5 g.

*Example 6.*—If the material is to have a matrix $6Ca_3(PO_4)_2 \cdot 1CaCl_2 \cdot 1CaBr_2$ and is also to contain 3 per cent Sb and 5 per cent Mn, the formula in Example 1 is modified by replacing 2.45 g. of the calcium chloride with 3.3 g. calcium bromide, by increasing the manganese phosphate to 5.4 g., and by increasing the antimony trioxide to 1.3 g.

*Example 7.*—If the material is to have a matrix $3Sr_3(PO_4)_2 \cdot 1SrF_2$ and is also to contain 3 per cent Sb, the raw mixture may consist of:

| | Grams |
|---|---|
| Strontium phosphate (prepared as above) | 20.6 |
| Strontium fluoride (prepared as above) | 1.7 |
| Antimony trioxide | 0.7 |

Other methods of preparing our luminescent materials are possible, and may be as satisfactory in results as those described. For instance, manganese may be introduced as a halide instead of as a phosphate; and the phosphate of the metal M may be produced during the heating of the raw mixture to form the phosphor, by the reaction of carbonate of the metal M with ammonium phosphate (these substances forming ingredients of the raw mixture, instead of being prepared beforehand). A method of this last kind (as regards part of the phosphate) will now be described by way of illustration, being the preferred method of making the resulting phosphor:

*Example 8.*—If the material is to have a matrix

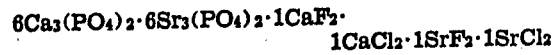

and is also to contain 3 per cent Sb and 1 per cent Mn, the raw mixture may consist of:

| | Grams |
|---|---|
| Calcium phosphate (prepared as above) | 18.6 |
| Calcium fluoride (prepared as above) | 0.65 |
| Calcium chloride containing 25% water | 1.25 |
| Strontium carbonate (prepared by precipitating strontium chloride with ammonium carbonate) | 22.2 |
| Ammonium hydrogen phosphate | 13.2 |
| Strontium fluoride (prepared as above) | 1.05 |
| Strontium chloride, anhydrous | 1.3 |
| Antimony trioxide | 1.53 |
| Manganese phosphate (prepared as above) | 1.25 |

The treatment of this mixture should follow the procedure above indicated.

An example may also be given to illustrate the preparation of a halo-phosphate phosphor from a mixture comprising alkaline earth metal oxide in addition to that called for by the typical halophosphate formula, the amount of additional oxide being such that it is somehow included in the lattice structure of the phosphor, instead of appearing as a mere extraneous impurity.

*Example 9.*—For a calcium fluoro-phosphate of this character activated with antimony and manganese, the raw mixture may consist of:

| | Grams |
|---|---|
| Calcium phosphate | 200 |
| Calcium fluoride | 24 |
| Calcium carbonate | 50 |
| Antimony trioxide | 8 |
| Manganese phosphate to give from zero to 10 per cent of Mn by weight in the final product. | |

Both steps of heating as described above may be carried out at 1100° C. in an open crucible, with previous and intermediate grinding. After finally cooling and being ground, if desired, the product may be sieved, when it is ready for use.

Examples will now be given to illustrate the preparation of phosphors containing tin or lead as primary activators.

*Example 10.*—For a calcium chlorophosphate activated with lead and manganese, the raw mixture may consist of:

| | Grams |
|---|---|
| Calcium phosphate | 18.6 |
| Calcium chloride containing 25% water | 2.4 |
| Lead phosphate | 3.4 |
| Manganese phosphate | 1.3 |
| Ammonium fluoride | 10.9 |

Both steps of heating as described above may be carried out at 1100° C. in a tightly plugged boat in the quartz tube, with intermediate and final grinding and final washing and drying as described; and after drying, the product may be sieved. It is essentially a calcium chlorophosphate containing about 15 per cent Pb and 2½ per cent Mn.

*Example 11.*—For a calcium chlorophosphate activated with tin and manganese, the formula in Example 10 is modified by replacing the 3.4 g. lead phosphate with 1.4 g. stannous chloride, $SnCl_2 \cdot 2H_2O$, and the heating is confined to one single period of ½ hour, other steps and conditions being the same as in Example 9. The product is essentially a calcium-chlorophosphate containing about 4 per cent Sn and 2½ per cent Mn.

*Example 12.*—For a strontium chlorophosphate activated with lead and manganese, the raw mixture may consist of:

| | Grams |
|---|---|
| Strontium phosphate | 17.2 |
| Strontium chloride, $SrCl_2 \cdot 6H_2O$ | 3.0 |
| Lead nitrate | 2.0 |
| Manganese phosphate | 1.3 |
| Ammonium fluoride | 0.8 |

The procedure and conditions may be the same as in Example 10.

Under excitation from a low pressure mercury discharge lamp having a quartz envelope (and mainly or largely by 2537 A. radiation), the phosphor prepared according to Example 10 yields yellow-orange light; that prepared according to Example 11 yields orange light; and that prepared according to Example 12 yields yellowish light.

Halophosphates of alkaline earth metals activated with bismuth, with or without antimony and with or without manganese, may be prepared in essentially the same way as those activated with antimony with or without manganese, as described above. Calcium fluoro- and chlorophosphates of this character are exemplified by $3Ca_3(PO_4)_2 \cdot 1CaF_2 + 7\frac{1}{2}\%$ Bi, which gives nearly white luminescent light; by $3Ca_3(PO_4)_2 \cdot 1CaF_2 + 3\%$ Bi + 1% Mn, which also gives nearly white light; by $3Ca_3(PO_4)_2 \cdot 1CaCl_2 + 7\frac{1}{2}\%$ Bi + 3% Mn, which gives reddish light; by $3Ca_3(PO_4)_2 \cdot 1CaF_2 + 7\frac{1}{2}\%$ Bi + 3% Sb which gives pale pink light—all under 2537 Å. excitation as described above.

Barium halophosphates

For the preparation of the barium halo-phosphates, barium fluoride may be prepared as follows: 244 grms. barium chloride ($BaCl_2 \cdot 2H_2O$) is dissolved in 1 litre of hot distilled water to form solution A'. 100 grms. ammonium fluoride is dissolved in 250 mls. of hot distilled water to form solution B'. 10 mls. of solution A' are added to solution B' and 10 mls. of solution B' are added to solution A'. The resulting liquids are filtered and the filtrates are mixed. The precipitate is separated by filtration, washed six times with hot distilled water, dried at 160° C. and ground. As pointed out hereinbefore, strontium fluoride may be prepared in an analogous manner.

Strontium chloride ($SrCl_2 \cdot 6H_2O$) is prepared by dissolving strontium carbonate in the calculated quantity of dilute hydrochloric acid and crystallizing from this liquor.

Barium phosphate may be prepared as follows: 1180 grms. $BaCO_3$ is mixed into a slurry with 1500 mls. of cold distilled water to form C'. 255 mls. of phosphoric acid is diluted to 500 mls. of cold distilled water and called solution D'. C' is added to solution D' slowly and with constant stirring. When effervescence has ceased the liquid is filtered, the precipitate is dried at 160° C. and ground. As pointed out hereinbefore, strontium phosphate may be prepared from strontium carbonate in an analogous manner.

Antimony tri-oxide may be prepared as follows: 500 grms. antimony trichloride is dissolved in the minimum amount of cold concentrated hydrochloric acid. Ammonia solution (S. G.

0.880) is then slowly added with constant stirring until no further precipitation occurs. The precipitate is filtered off and washed six times in boiling distilled water, dried at 160° C. and ground. The resulting white powder may contain a little oxychloride of antimony.

The preparation of manganese phosphate has been described hereinbefore but will be repeated, for convenience, as follows: 396 gm. ammonium hydrogen phosphate $(NH_4)_2HPO_4$ is dissolved in two litres of boiling distilled water to form solution E'. 594 gm. manganese chloride is dissolved in 5 litres of distilled water to form solution F'. 10 ml. of solution E' is added to solution F', and 10 ml. of solution F' to solution E'; the resulting liquids are filtered and the filtrates mixed. The precipitate is separated by filtration, washed with boiling distilled water, and dried at 160° C. The dried product is ground.

*Example 13.*—If the material required is $3Ba_3(PO_4)_2.1BaF_2 + 3\%$ Sb $+ 1.7\%$ Mn, the substance to be heated may consist of a mixture of 66.3 grms. barium phosphate, 5.8 grms. barium fluoride, 2.4 grms. antimony tri-oxide and 2.6 grms. manganese phosphate. This mixture is furnaced in a silica boat closed by a glass wool plug at 1000° C. for ½ hour and allowed to cool. When cool the substance is ground and re-furnaced for a further ½ hour at the same temperature. If necessary a small amount of barium carbonate or ammonium phosphate may be added to the initial mixture to produce the optimum luminescent efficiency.

The proportions of $BaCO_3$ and $P_2O_5$ are critical for best results. It is frequently found that to achieve the optimum result it is necessary to adjust the relative proportions of these two constituents by the addition of one of them. The quantities of these substances to be added have been found to vary between about 0 and 2% $BaCO_3$ and between 0 and 4% $P_2O_5$; thus in some cases a small quantity of $BaCO_3$ may be needed and in others a small quantity of $P_2O_5$ will be found to give best results.

The powder, after the second heat treatment, may be ground, washed and sieved to the required particle size. The powder shows a yellow fluorescence under U. V. light of 2537A.

Materials with different luminescent properties may be prepared by partially or completely replacing the barium fluoride by barium chloride and also by increasing or decreasing the percentage of manganese in the initial mixture. The luminescent colors and approximate brightnesses of some modified compositions are given in the following table.

| Composition | Percentage of Manganese | | | |
| --- | --- | --- | --- | --- |
| | 0 | 2 | 5 | 7.5 |
| $3Ba_3(PO_4)_2.1BaF_2+3\%$ Sb | Bright Yellow | Moderate Yellow (more saturated) | Weak Yellow | Weak Yellow |
| $3Ba_3(PO_4)_2.1BaFCl+3\%$ Sb | Moderate Yellow (more saturated) | Weak yellow | Very weak yellow | |
| $3Ba_3(PO_4)_2.1BaCl_2+3\%$ Sb | Weak yellow | Very weak yellow | | |

*Example 14.*—If the material required is $3Ba_3(PO_4)_2.1\ BaF_2+5\%\ Pb+1.7\%$ Mn, the substance to be heated may be a mixture of 66.3 grms. barium phosphate, 5.8 grms. barium fluoride, 3.3 grms. ammonium fluoride, 2.8 grms. manganese phosphate and 5.3 grms. lead nitrate. This mixture is furnaced in a silica boat closed by a glass wool plug at 950° C. for ½ hour. The product may then be ground, washed and sieved to the required particle size. As in the preceding example a small amount of barium carbonate or ammonium phosphate (usually from 0 to 2 % $BaCO_3$ and 4–0% $P_2O_5$) is added to the initial mixture to produce the optimum luminescent efficiency. This powder shows a pinky-red fluorescence under U. V. light of 2537A.

*Example 15.*—The initial mixture of Example 14 is modified by the addition of 6.3 grms. stannous chloride in place of the lead nitrate, and the method of preparation is otherwise the same as in Example 14. This powder shows a yellow-green fluorescence.

*Example 16.*—If the material required is $3Ba_3(PO_4)_2.½\ BaF_2.½\ BaCl_2.3\ Sr_3(PO_4)_2.½\ SrF_2.½\ SrCl_2 + 3\%$ Sb $+ 1\%$ Mn, the following mixture is prepared: 33.1 grms. barium phosphate, 25.8 grms. strontium phosphate, 1.5 grms. barium fluoride, 2.0 grms. barium chloride ($BaCl_2.2H_2O$), 1.0 grm. strontium fluoride, 2.2 grms. strontium chloride ($SrCl_2.6H_2O$), 2.1 grms. antimony trioxide and 2.1 grms. manganese chloride ($MnCl_2.4H_2O$). This mixture is ground and furnaced in a silica tube closed by a glass wool plug for half an hour at 1100° C. When cool the mixture is ground and re-furnaced. When again cool the mixture may be ground and washed with distilled water. When excited by short wave U. V. light of 2537 A this powder shows a yellowy white luminescence.

If necessary in order to produce the best luminescense a small amount of barium carbonate or ammonium phosphate may be added before furnacing as in the previous examples.

*Example 17.*—If the material required is $3Ba_3(PO_4)_2.½\ BaF_2.½\ BaCl_2.3\ Ca_3(PO_4)_2.½\ CaF_2.½\ CaCl_2 + 3\%$ Cb $+ 1\%$ Mn, the following mixture is prepared: 33.1 grms. barium phosphate, 18.6 grms. calcium phosphate, 1.5 grms. barium fluoride, 2.0 grms. barium chloride ($BaCl_2.2H_2O$), 0.7 grm. calcium fluoride, 1.3 grms. calcium chloride, 1.8 grms. antimony trioxide and 1.8 grms. manganese chloride. The calcium chloride is dried, and contains about 27.5% of water. The remaining constituents may be prepared as described herein.

This mixture is ground and furnaced in a silica tube closed by a glass wool plug for half an hour at 1100° C. When cool the mixture is ground and re-furnaced. When again cool it may be ground and washed with distilled water. The powder shows a pale pink luminescence under short wave U. V. light 2537A. The content of $BaCO_3$ and $P_2O_5$ may, if necessary, be adjusted as already described.

What we claim as new and desire to secure by Letters Patent of the United States is:

1. A luminescent composition consisting essentially of a matrix of halophosphate of alkaline earth metal, wherein the halogen is of the group consisting of fluorine, chlorine, bromine and mixtures thereof, and an activating proportion of metal of the group consisting of antimony, bismuth, tin, lead and mixtures thereof.

2. A luminescent composition consisting essentially of a matrix of halophosphate of alkaline earth metal, wherein the halogen is of the group consisting of fluorine, chlorine, bromine and mixtures thereof, and an activating proportion of metal of the group consisting of antimony, bismuth, tin, lead and mixtures thereof, and up to about 10 per cent manganese as a supplemental activator.

3. A luminescent composition consisting essentially of a halophosphate of alkaline earth metal wherein the halogen is of the group consisting of fluorine, chlorine, bromine and mixtures thereof, and an activating proportion of antimony and up to about 10 per cent manganese as a supplemental activator.

4. A luminescent composition consisting essentially of a matrix of halophosphate of alkaline earth metal, wherein the halogen is of the group consisting of fluorine, chlorine, bromine and mixtures thereof, and an activating proportion of antimony.

5. A luminescent material according to claim 4 with the activating antimony in the proportion of 2 to 6 per cent by weight, and with manganese in proportion up to 10 per cent by weight as a supplemental activator.

6. A luminescent material consisting essentially of a matrix of halophosphate of alkaline earth metal, wherein the halogen is of the group consisting of fluorine, chlorine, bromine and mixtures thereof, and an activating proportion of bismuth.

7. A luminescent material according to claim 6 with the activating bismuth in proportion up to 7½ per cent by weight, and with an activating proportion of manganese as a supplemental activator.

8. A luminescent composition consisting essentially of fluorophosphate of alkaline earth metal and an activating proportion of antimony.

9. A luminescent composition consisting essentially of fluorophosphate of alkaline earth metal and activating proportions of antimony together with manganese.

10. A luminescent composition consisting essentially of fluorophosphate of alkaline earth metal, and an activating proportion of metal of the group consisting of antimony, bismuth, tin, lead and mixtures thereof, and up to about 10 per cent manganese as a supplemental activator.

11. A luminescent composition consisting essentially of chlorophosphate of alkaline earth metal, and an activating proportion of metal of the group consisting of antimony, bismuth, tin, lead and mixtures thereof, and up to about 10 per cent manganese as a supplemental activator.

12. A luminescent composition consisting essentially of chlorofluorophosphate of alkaline earth metal, and an activating proportion of metal of the group consisting of antimony, bismuth, tin, lead and mixtures thereof.

13. A luminescent composition consisting essentially of chlorophosphate of alkaline earth metal and an activating proportion of antimony.

14. A luminescent composition consisting essentially of chlorophosphate of alkaline earth metal and activating proportions of antimony together with manganese.

15. A luminescent composition consisting essentially of strontium chlorofluorophosphate and an activating proportion of lead, and also up to about 10% manganese as a supplemental activator.

16. A luminescent composition consisting essentially of calcium chloro-fluoro-phosphate and activating proportions of antimony and manganese.

17. A luminescent composition consisting essentially of a matrix of halophosphate of alkaline earth metal, wherein the halogen is of the group consisting of fluorine, chlorine, bromine and mixtures thereof, activated with about ½ per cent to 15 per cent by weight of antimony and 0 to 10 per cent by weight of manganese.

18. A luminescent composition consisting essentially of calcium chloro-fluoro-phosphate activated with about ½ per cent to 15 per cent by weight of antimony and 0 to 10 per cent by weight of manganese.

19. A luminescent composition consisting essentially of a matrix of halophosphate of alkaline earth metal, wherein the halogen is of the group consisting of fluorine, chlorine and bromine and mixtures thereof, and an activating proportion of lead, and up to about 10 per cent of manganese as a supplemental activator.

20. A luminescent composition consisting essentially of a matrix of halophosphate of alkaline earth metal, wherein the halogen is of the group consisting of fluorine, chlorine, bromine and mixtures thereof, and an activating proportion of metal of the group consisting of antimony, bismuth, tin and lead with 0 to 10 per cent by weight of manganese.

ALFRED H. McKEAG.
PETER W. RANBY.

REFERENCES CITED

The following references are of record in the file of this patent:

UNITED STATES PATENTS

| Number | Name | Date |
|---|---|---|
| 2,226,407 | McKeag | Dec. 24, 1940 |